Dec. 22, 1959  R. B. PORTIS ET AL  2,917,753
DEVICE FOR SUPPORTING A HUMAN BODY
Filed Feb. 1, 1957  5 Sheets-Sheet 1

INVENTORS
ROBERT B. PORTIS
ROBERT E. PHILLIPS
BY
Fulwider Mattingly & Babcock
Attorneys

Inventors
Robert B. Portis
Robert E. Phillips

Inventors
ROBERT B. PORTIS
ROBERT E. PHILLIPS

United States Patent Office 2,917,753
Patented Dec. 22, 1959

2,917,753

DEVICE FOR SUPPORTING A HUMAN BODY

Robert B. Portis, Beverly Hills, and Robert E. Phillips, Los Angeles, Calif.

Application February 1, 1957, Serial No. 637,841

35 Claims. (Cl. 5—66)

The present invention relates broadly to devices for supporting a human body, such devices including beds, chairs, lounges, couches and the like. One form of the invention is embodied in a bed having its length divided into a plurality of pivotally connected sections, the relative angularity of which may be controlled by the bed's occupant.

This application is a continuation-in-part of our co-pending application Serial No. 416,071, filed March 15, 1954, now abandoned.

The particular embodiment of the present invention is shown and described herein in connection with a bed that includes a back rest section, a seat section, a thigh section, and a lower leg section. These various sections comprise the spring frame of the bed and they are pivotally secured to each other in such a manner that the bed's occupant may, by shifting his weight, cause them to change their relative angularity. In this manner the user may, without assistance, adjust the various sections so as to obtain a desired configuration of the spring frame. The adjustable bed of the present invention is especially adapted for use with invalids. When so employed, the invalid is enabled to readily change his body position so as to be better able to eat, to write, to be bathed, or to enter and leave the bed without requiring a stool. Additionally, the patient may easily effect frequent changes of his body position during the time he is bedridden. The ability to effect such frequent body changes often aids in a rapid recovery.

A major object of the present invention is to provide a novel adjustable device for supporting a human body which may be operated solely by a shift in the body weight of the occupant, as distinguished from the majority of the heretofore proposed adjustable devices which require either the exertion of a manual thrust on one or more of the sections to move the latter to various positions, or a source of power such as electricity or a complex cranking mechanism for this purpose.

An important feature of the present invention resides in the novel use of a parallelogram-type kinematic arrangement wherein a back section is pivotally mounted to the frame for movement about a horizontal axis, and a substantially horizontal seat section is pivotally connected to the back section. As the back section swings about its pivotal axis, the seat section is raised or lowered accordingly. The parallelogram-type kinematic arrangement is such that the seat section is maintained in a substantially or approximately horizontal position throughout its movement, and the sections may be adjusted to any selected one of their various adjustable positions solely by a shift in the body weight of the occupant. More specifically, the occupant may cause the back section to lower toward the horizontal position and the seat section to raise by shifting his weight toward the head or outer end portion of the back section. The back section may be raised and the seat section lowered by shifting of the occupant's resultant weight in the opposite direction, that is, to the seat section or to a point on the back section between said pivotal axis as the seat section.

Another object is to provide an adjustable device of the afore-described nature which employs a simple yet rugged construction whereby it may afford a long and trouble-free service life.

A more particular object of the invention is to provide an adjustable device of the afore-described nature wherein the seat, thigh, and lower leg sections may either be locked together for simultaneous vertical movement, as the back rest section pivots relative thereto, or alternately, the seat, thigh, and lower leg sections may pivot relative to one another as the back rest section pivots. With this arrangement, the several sections of the device may be moved into various positions necessitated by the patient's particular condition.

An additional object is to provide controls which are readily accessible to and operable by an occupant of the device.

A further object is to provide a bed which permits its occupant to sleep with his head in an elevated position.

These and other objects and advantages of the present invention will become apparent from the following detailed description of a preferred embodiment thereof, when taken in conjunction with the appended drawings, wherein:

Figure 1:
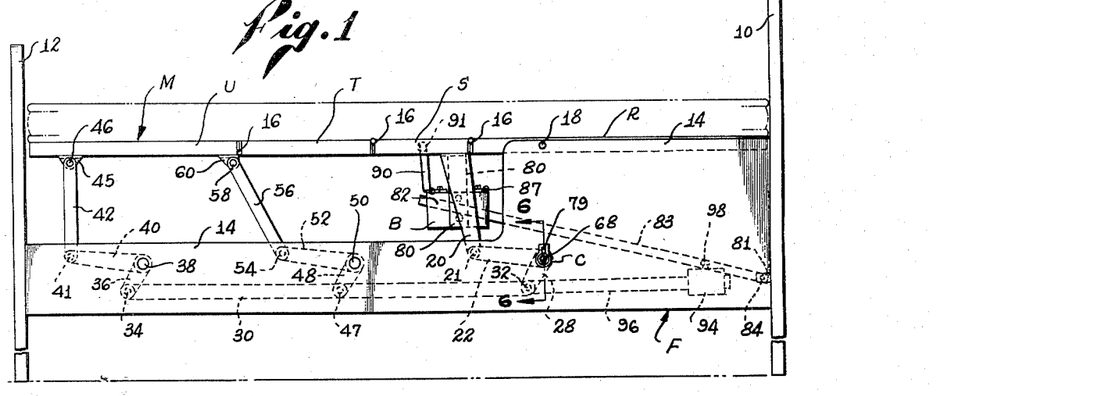
Figure 1 is a side elevational view of a preferred form of adjustable bed embodying the present invention with its sections arranged in a normal, horizontally aligned position.

The preferred form of adjustable bed embodying the present invention includes a main frame F that supports an auxiliary spring frame M having a back-rest section R, a seat section S, a thigh section T, and a lower leg section U. Normally, these sections will be maintained in an aligned horizontal relationship as shown in Figure 1. It is possible, however, for an occupant of the bed to cause these sections to assume either their position of Figure 2, or, alternately, a position similar to that shown in Figure 3. The bed's occupant may effect control over the operation of the various sections of the bed by means of a control mechanism C and a brake mechanism B.

More particularly, the main frame F includes a vertically extending head piece 10 at its rear end and a vertically extending foot piece 12 at its front end between which pieces are rigidly mounted a pair of parallel, longitudinally extending side pieces 14 and 15. The spring frame M may conveniently be fabricated from elongated steel channel-shaped elements. The ends of adjoining sections R, S, T and U are pivotally connected by hinges 16, which hinges permit movement to occur in only one direction, as will be made clear from the drawings.

Figures 4, 5, 6:
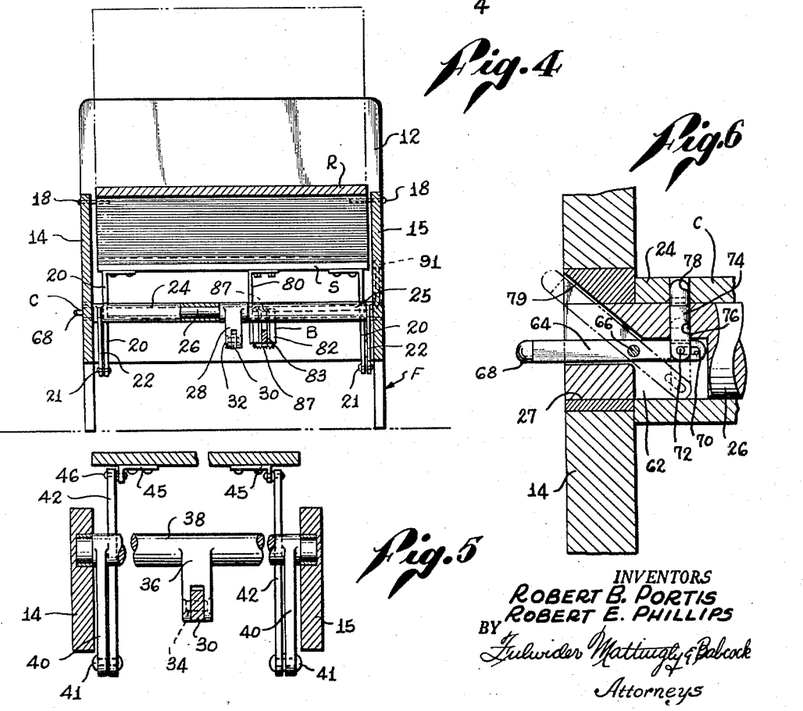
Figure 4 is a vertical sectional view taken on line 4—4 of Figure 3.
Figure 5 is an enlarged vertical sectional view taken on line 5—5 of Figure 2.
Figure 6 is an enlarged vertical sectional view taken on line 6—6 of Figure 1.

The lower portion of the back rest section R is pivotally secured between the side pieces 14 and 15 by a pair of aligned pivot pins 18. The end of the seat section S adjacent the back rest section rigidly mounts a pair of depending brackets 20. The lower ends of these brackets 20 are pivotally joined by pins 21 one to one end each of a pair of crank arms or levers 22, as shown in Figure 4. These crank arms 22 have an effective length corresponding to the distance from the pivot pins 18 to the hinged end of the back rest section. The opposite ends of each of the crank arms 22 are rigidly secured to the outer end of one of a pair of transversely extending horizontal tubes or hollow shafts 24 and 25. The latter tubes are journaled upon a transversely extending horizontal shaft 26, having its ends in turn journaled within aligned bores 27 formed in the side pieces 14 and 15. The shaft 26 preferably is located in vertical alignment with the pivot pins 18 and is spaced from said pivot pins a distance corresponding to the effective length of the depending brackets 20. The mid-portion of the horizontal shaft 26 is integrally formed with a lever element 28 is pivotally joined to the rear end of a horizontally extending, longitudinal force-transfer bar 30 by a pin 32.

The front end of the force-transfer bar 30 is pivotally joined by a pin 34 to a short lever 36 which is integrally formed at the mid-portion of a second transversely extending horizontal shaft 38 journaled between the front portion of the frame side pieces 14 and 15. As shown in Figure 5, a pair of crank arms 40 are rigidly joined to the outer ends of the shaft 38. The distal ends of these crank arms 40 are pivotally joined by pins 41 to the lower ends of a pair of link elements 42. The upper ends of these link elements 42 are in turn pivotally joined to depending lugs 45 formed on the front portion of the lower leg section U by pins 46.

The intermediate portion of the force-transfer bar 30 is pivotally joined by a pin 47 to a short lever 48 which is integrally formed at the mid-portion of a third transversely extending horizontal shaft 50 journaled between the intermediate portion of the frame side pieces 14 and 15. A pair of crank arms 52 are rigidly joined to the outer end of the shaft 50. The distal ends of the crank arms 52 are pivotally joined by pins 54 to the lower ends of another pair of link elements 56. The upper ends of the latter are pivotally joined by pins 58 to the depending lugs 60 formed on the rear portion of the lower leg section U.

Referring now to Figure 6, the control mechanism C is interposed between one of the tubes 24 and the horizontal shaft 26. One end of the shaft 26 is formed with a cavity 62 wherein a control rod 64 is pivotally mounted by a horizontal pin 66. One end of the control rod 64 extends outwardly of the cavity 62, as indicated at 68, whereby it may be grasped by an occupant of the bed. The inner end of the control rod 64 is formed with an elongated slot 70. A horizontal pin 72 slidably disposed in the slot 70 serves to interconnect the inner end of the control rod and a dog element 74. The dog element 74 is adapted for vertical movement within a bore 76 formed in the horizontal shaft and extending upwardly from the inner portion of the cavity 62. During such vertical movement the dog element 74 will be shifted between its solid line and dotted line positions of Figure 6. In its raised position the upper end of the dog 74 will be disposed within an aperture 78 formed in the tube 24 in alignment with the bore 76. When the dog is in its lowered position, the outer portion of the rod 64 will be disposed within a notch 79 formed in the side element 14 of the main frame.

Figures 2, 9:
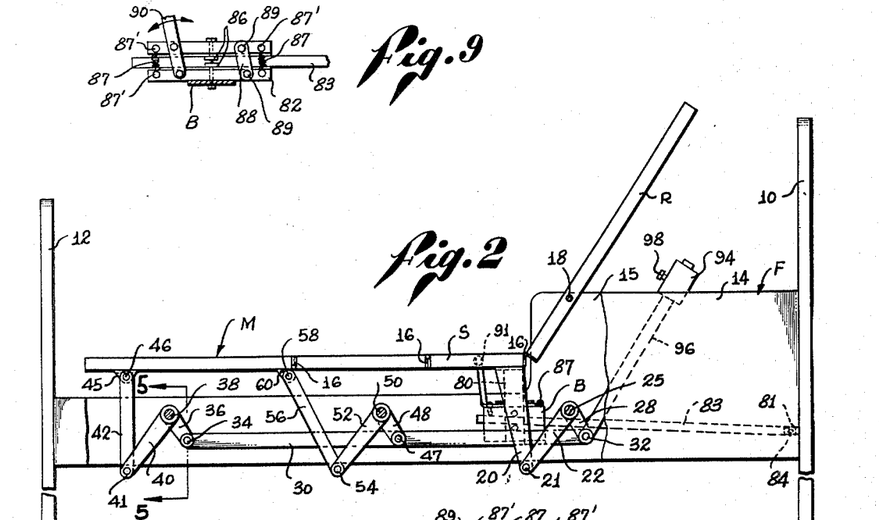
Figure 2 is a side elevational view showing the sections of said bed adjusted to a first position.
Figure 9 is a top view taken from a point designated 9 in Figure 7.
Figures 7, 8:
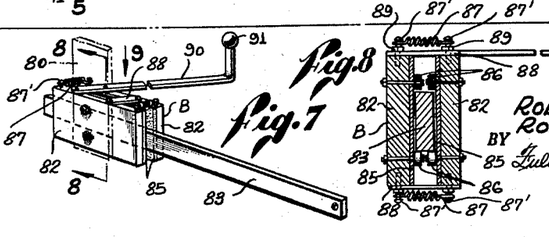
Figure 7 is a perspective view of a brake mechanism utilized with said bed.
Figure 8 is an enlarged vertical sectional view taken on line 8—8 of Figure 7.

The brake mechanism B is shown interposed between a depending bracket 80 formed on the intermediate part of the seat section S and a lug 81 formed on the lower portion of the head piece 10. This brake mechanism B includes a pair of aligned plates 82 and an elongated tongue element 83, the front portion of the tongue element 83 being axially slidably carried between the plate 82 and the rear end thereof being pivotally secured to the lug 81 by a pin 84. Brake lining 85 is bonded to the inner faces of the plates 82. As shown in Figures 8 and 9, the plates 82 carry rollers 86 for guiding the front portion of the tongue 83. Normally, the plates 82 will be constantly urged towards one another by tension springs 87, anchored to plates 82 through headed pins 87' whereby the tongue 83 will be restrained against movement relative thereto. The plates are inter-connected by means of short links 88 which are pivotally secured to either plate by bolts 89. These links 88 are disposed at an angle relative to the longitudinal axes of the plates 82. The plates may be selectively urged apart by means of a brake lever 90 that forms an integral sideward extension of one of the links 88. The brake lever includes a handle 91 which extends upwardly from the outer end thereof so as to be within easy reach of an occupant of the bed. The mode of operation of the brake mechanism will be made clear by reference to Figure 9. Referring thereto, it will be observed that urging of the outer portion of the brake lever 90 to the right will cause the plates 82 to be separated. Upon such separation, the tongue 83 will be free to slide relative to the plates.

It should be noted that the various sections of the bed should be constantly biased towards their horizontally aligned position of Figure 1. Accordingly, the preferred form of bed includes a counterbalance weight 94 which is carried by a post 96, the latter being rigidly joined to the short lever 28. The counterbalance weight 94 is longitudinally adjustable along the length of the post 96 by means of a set screw 98 utilized to interconnect these elements. In Figure 4, the post 96 has not been shown in the interest of clarity.

In the operation of the bed the various sections thereof are normally disposed in their horizontally aligned position of Figure 1 with the brake mechanism B being set in a locked position. Assuming that the occupant of the bed desires to adjust the bed to the position shown in Figure 2, he will urge the control rod 64 to its solid line position of Figure 6 in which position the dog 74 is seated within the aperture 78 of the tube 24. The brake mechanism may then be moved to a disengaged setting. Thereafter, it is only necessary for the bed's occupant to shift his weight forward a slight degree. The back rest section R will then pivot toward a vertically inclined position, and the seat, thigh, and lower leg sections will move downwardly while retaining their horizontally aligned disposition. It should be particularly noted that such movement of the bed's sections may be accomplished by only a slight shifting of the occupant's weight. This is true because the approximate center of gravity of the occupant's torso coincides generally with the fulcrum point of the back rest section R, that is, the axis of the pins 18. Accordingly, the weight of the bed's occupant is substantially equally distributed along the first lever arm extending from the axis of the pins 18 toward the rear end of the back rest section R, and along a second lever arm extending in the opposite direction from the axis of the pins 18 to the front of the seat section S. It is this arrangement which permits the bed to be readily adjusted solely by a slight shifting of the occupant thereof. This is in direct contradistinction to the majority of the heretofore-proposed adjustable beds of this nature which require either an outside source of energy for effecting a shifting of its parts, or alternately, a complex cranking mechanism. During the movement of the parts from their position of Figure 1 to that of Figure 2, the linkage means comprising the force-transfer bar 30 and the various levers, crank arms, and link elements connected thereto constitute a parallelogram mechanism that is interposed between the seat section S and the thigh and lower leg sections T and U. Once the sections of the bed have assumed a position desired by the bed's occupant, the latter may set the brake mechanism so as to cause the sections to retain such a position.

In this regard it will be clear that the tongue 83 of the brake mechanism will normally be restrained against axial movement relative to the plates 82. However, when the bed's occupant pulls the brake lever handle 91 rearwardly, the tongue will be free to move relative to the plates, and the parts of the bed will likewise be free to undergo adjustment.

Figure 3:
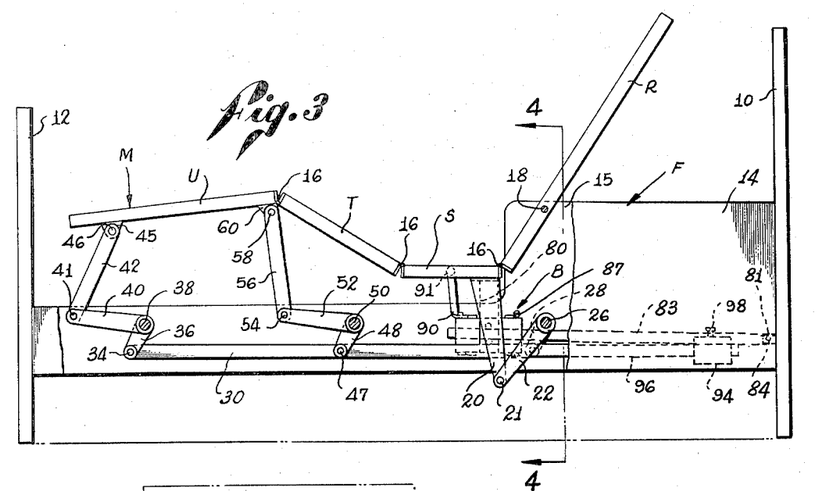
Figure 3 is a side elevational view showing the sections of said bed adjusted to a second position.

If the occupant of the bed wishes to adjust it from its normal position of Figure 1 to a position similar to that shown in Figure 3, he will first urge the control 64 to its dotted line position of Figure 6 wherein the dog 74 is withdrawn from the aperture 78 of the tube 24 and its outer end is positioned within the notch 79 formed in the frame side piece 14. The horizontal shaft 26, and hence the force-transfer bar 30, levers 36 and 48, shafts 38 and 50, and crank arms 40 and 52 will then be locked to the frame. The tubes 24 and 25 will be free to rotate independently of the shaft 26 and the frame. The brake lever handle 91 may then be moved rearwardly so as to free the tongue from the plate 82. Thereafter, the back rest section R will be free to pivot towards a vertically inclined position. While the seat section S drops vertically, the link elements 42 and 56 will be free to rotate relative to the free ends of crank arms 40 and 52 and the front end of the thigh section T will pivot upwardly while the front end of the lower leg section U pivots downwardly. When the sections of the bed have assumed the desired position, the bed's occupant may release the brake lever handle 91 so as to lock the sections against further movement. This position may be termed a "contour" position and it permits the bed's occupant to relax with his knees partially bent and his lumbar partially flexed, which condition is very desirable for treating low back sprain.

It should be particularly noted that during the movement of the various sections of the bed, the bed's occupant may "feel" his way between positions. This is an especially important consideration in the case of many invalids. It should be further noted that although the adjustable bed of the present invention is especially adapted for use with invalids as a hospital bed, it is also within the scope of the invention to utilize such a bed for ordinary domestic purposes. When so utilized, a plurality of hinged-together box springs may be employed in place of the channel-shaped spring frame elements shown in the drawings.

Figure 10:
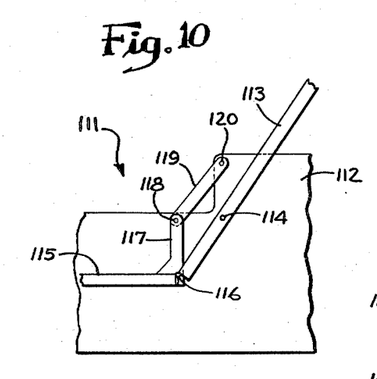
Figures 10 to 20 inclusive are side elevational views showing the kinematic arrangements of various modified forms of the invention.

Referring to Figure 10, there is shown a modified form of the invention designated generally by the reference numeral 111 and comprising a frame 112. A back section 113 is pivotally mounted to frame 112 for swinging movement about a horizontal pivotal axis 114. A seat section 115 has its rear portion pivotally connected at 116 to the forward end of the back section 113. A member 117 is fixedly secured at its lower end to the rear portion of seat section 115. The upper end of member 115 is pivotally connected at 118 to one end of a link member 119. The other end of the latter is pivotally connected to frame 112 at 120.

The distance between the horizontal pivotal axes 114 and 120 is substantially equal to the distance between the horizontal pivotal axes 116 and 118. Similarly, the distance between axes 114 and 116 is substantially equal to the distance between axes 120 and 118. It will thus be seen that sections 113 and 115 and members 117 and 119 constitute a parallelogram-type kinematic mechanism. As a result, seat section 115 will be maintained in its substantially horizontal orientation as it is raised or lowered during adjusting movements of the device. If the resultant body weight of the occupant is exerted on back section 113 to the right of horizontal axis 114 as viewed in Fig. 10, back section 113 will be caused to move downwardly in a clockwise direction about axis 114, assuming that the locking or brake mechanism B (described above with respect to the modification shown in Figs. 1 to 9 inclusive) is released. During this downward clockwise movement of back section 113, seat section 115 will be raised while maintaining its substantially horizontal orientation until a limiting position is reached wherein both back section 113 and seat section 115 are horizontal and coplanar. Conversely, if the resultant body weight of the occupant is exerted downwardly on seat section 115 or on that portion of back section 133 between axis 116 and axis 114, then back section 113 will swing in a counterclockwise direction about axis 114 as viewed in Fig. 10, and seat section 115 will move downwardly.

Since the entire kinematic arrangement comprises only pivotal connections, which have comparatively low frictional resistance, with the complete absence of sliding connections having relatively high frictional resistance, the occupant may adjust the sections to any selected position by merely a slight shift in his body weight without requiring the assistance of another person.

It will be understood that when the invention is embodied in a chair or similar device, the leg and thigh sections may be eliminated if desired. Although leg and thigh sections are not shown in Figs. 10 to 20 inclusive for purposes of simplification in illustration, it will be understood that they may be incorporated in the structural embodiments there shown and connected thereto in a manner similar to that previously described with respect to the embodiment of Figs. 1 to 9 inclusive, or in any other suitable manner as will be obvious to those skilled in the art from a study of the disclosure hereinabove. Furthermore, in order to clarify understanding of the kinematic arrangements shown in Figs. 10 to 20 inclusive, various other elements shown in Figs. 1 to 9 inclusive have been omitted from Figs. 10 to 20 inclusive, such as locking or brake mechanism B, counterbalance weight 94, head piece 10, foot piece 12, etc. It will be understood that these omitted elements, or suitable equivalents, may be incorporated in the structural embodiments of Figs. 10 to 20 inclusive in the same manner as shown in the prior figures.

It will be obvious that although there are shown and described only a single member 117 and a single member 119, each of these members may be arranged in pairs with the duplicate elements of each pair located adjacent a respective opposite side edge of the device in a manner similar to that shown in Fig. 4 with respect to the elements 20, 22. Similarly, the various members constituting the parallelogram mechanisms of Figs. 11 to 20 inclusive may be arranged in pairs, although these figures show only a single member in each instance for simplification and clarity in illustration.

Figure 11:
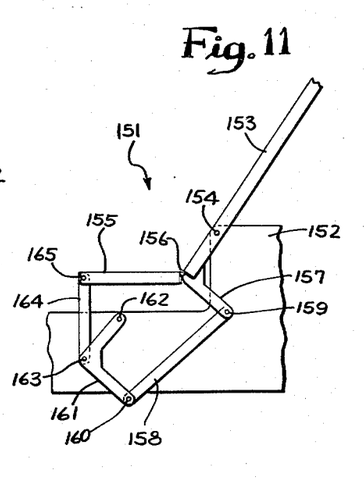

Referring now to Fig. 11, there is shown another modified form of the invention designated generally by the reference numeral 151 and comprising a frame 152. A back section 153 is pivotally mounted to frame 152 for swinging movement about horizontal pivotal axis 154. A seat section 155 has its rear portion pivotally connected at 156 to the forward end of back section 153. A member 157 is fixedly secured to or integral with the forward end of back section 153 and extends downwardly therefrom. A link member 158 has one end pivotally connected at 159 to the lower end of member 157, and the opposite end of link member 158 is pivotally connected at 160 to the lower end of bell-crank member 161. The opposite end of the latter is pivotally mounted to the frame at 162, and the intermediate portion of member 161 is pivotally connected at 163 to the lower end of another link member 164 having its upper end pivotally connected at 165 to the forward end of seat section 155.

The distance between axes 154 and 156 is substantially equal to the distance between axes 162 and 163. The distance between axes 156 and 163 is substantially equal to the distance between axes 154 and 162. The distance between axes 156 and 159 is substantially equal to the distance between axes 165 and 162. The distance between axes 154 and 159 is substantially equal to the distance between axes 162 and 160. It will thus be seen that the sections and members constitute a parallelogram-type kinematic mechanism having the same advantageous mode of operation heretofore described with respect to the modifications shown in Figs. 1 and 10.

Figure 12:
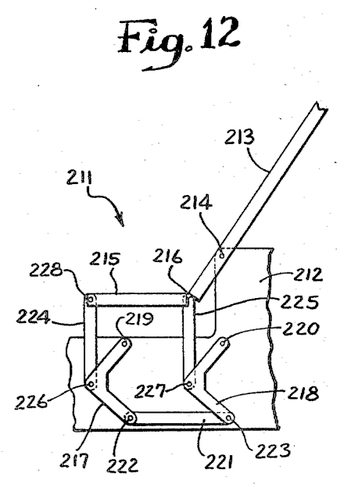

Referring to Fig. 12, there is shown still another modified form of the invention designated generally by the reference numeral 211 and comprising a frame 212. A back section 213 is pivotally mounted to frame 212 for swinging movement about a horizontal axis 214. A seat section 215 has its rear portion pivotally connected at 216 to the forward end of back section 213. A pair of bell-crank members 217, 218 have their upper ends pivotally connected to frame 212 at 219 and 220 respectively. A horizontal link member 221 has its opposite ends pivotally connected at 222, 223 to the respective lower end of members 217, 218. A pair of vertical link members 224, 225 have their lower ends pivotally connected at 226, 227 respectively to the intermediate portions of bell-crank members 217, 218. The upper end of vertical link member 224 is pivotally connected at 228 to the forward end of seat section 215, and the upper end of vertical link member 225 is pivotally connected to the rear of seat section 215 about a horizontal axis coincident with axis 216.

The distance between axes 214 and 216 is substantially equal to the distance between axes 219 and 226. The distance between axes 214 and 220 is substantially equal to the distance between axes 228 and 226 and to the distance between axes 216 and 227. The distance between axes 219 and 226 is substantially equal to the distance between axes 220 and 227. The distance between axes 226 and 222 is substantially equal to the distance between axes 227 and 223. The distance between axes 219 and 220 is substantially equal to the distance between axes 222 and 223 and to the distance between axes 228 and 216. It will thus be seen that the sections and members constitute a parallelogram-type kinematic mechanism having the same advantageous mode of operation heretofore described with respect to the modifications shown in Figs. 1 and 10.

Figure 13:
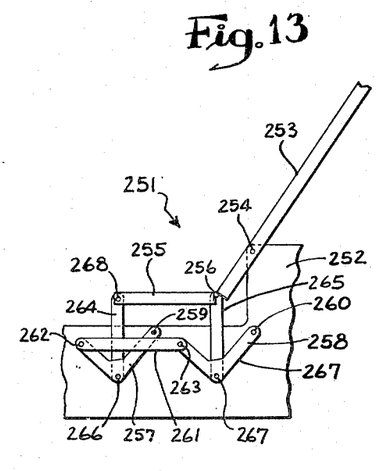

Referring to Fig. 13, there is shown still another modified form of the invention designated generally by the reference numeral 251 and comprising a frame 252 to which a back section 253 is pivotally mounted for swinging movement about a horizontal axis 254. A seat section 255 has its rear portion pivotally connected at 256 to the forward end of back section 253. A pair of bell-crank members 257, 258 each have one end pivotally mounted to frame 252 at 259, 260 respectively. A horizontal link member 261 has one end pivotally connected at 262 to the other end of bell-crank member 257. The opposite end of horizontal link member 261 is pivotally connected at 263 to the other end of bell-crank member 258. A pair of vertical link members 264, 265 have their lower ends pivotally connected at 266, 267 to the intermediate portions of bell-crank members 257, 258 respectively. The upper end of vertical link member 264 is pivotally connected at 268 to the forward end of seat section 255, and the upper end of vertical link member 265 is pivotally connected to the rear end of seat section 255 about a pivotal axis coincident with axis 256. The distances between the respective pairs of pivotal axes are substantially equal, as pointed out in the description of the modification shown in Fig. 12, whereby the arrangement of Fig. 13 constitutes a parallelogram-type kinematic mechanism functioning in the novel manner described above with reference to Figs. 1 and 10.

Figure 14:
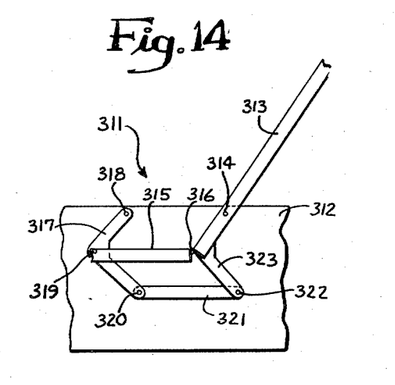

Referring to Fig. 14, there is shown still another modified form of the invention indicated generally by the reference numeral 311 and comprising a frame 312 and a back section 313 pivotally connected thereto for swinging movement about a horizontal axis indicated at 314. A seat section 315 has its rear end pivotally connected at 316 to the forward end of back section 313. A bell-crank member 317 has its upper end pivotally connected at 318 to frame 312 and its intermediate portion pivotally connected at 319 to the forward end of seat section 315. The lower end of bell-crank member 317 is pivotally connected at 320 to one end of a horizontal link member 321 having its other end pivotally connected at 322 to the lower end of a member 323 which is in turn rigidly secured to back section 313 adjacent the forward end of the latter.

The distance between pivotal axes 320 and 322 is substantially equal to the distance between pivotal axes 319 and 316, and also to the distance between axes 318 and 314. The distance between axes 318 and 319 is substantially equal to the distance between axes 314 and 316. The distance between axes 319 and 320 is substantially equal to the distance between axes 316 and 322. It will thus be seen that the above-described sections and members of Fig. 14 constitute a parallelogram-type kinematic mechanism having the above-described advantages.

Figure 15:
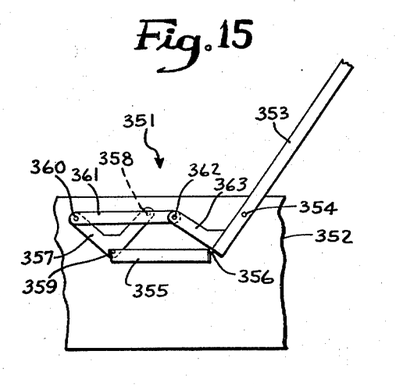

Referring now to Fig. 15, there is disclosed still another modified form of the invention indicated generally by the reference numeral 351 and comprising a frame 352 to which a back section 353 is pivotally mounted for swinging movement about a horizontal axis indicated at 354. A seat section 355 has its rear end pivotally connected at 356 to the forward end of back section 353. A bell-crank member 357 has one end pivotally connected at 358 to frame 352. The intermediate portion of bell-crank member 357 is pivotally connected at 359 to the forward end of seat section 355. The other end of bell-crank member 357 is pivotally connected at 360 to the forward end of a horizontal link member 361 having its rear end pivotally connected at 362 to a member 363 fixedly secured to the forward end of back section 353 and extending upwardly and forwardly therefrom. Each pair of pivotal axes is spaced a distance apart substantially equal to the distance between a corresponding pair of pivotal axes, as pointed out with respect to the structure shown in Fig. 14, whereby the structure shown in Fig. 15 constitutes a parallelogram-type kinematic mechanism functioning in the novel manner heretofore described.

Figure 16:
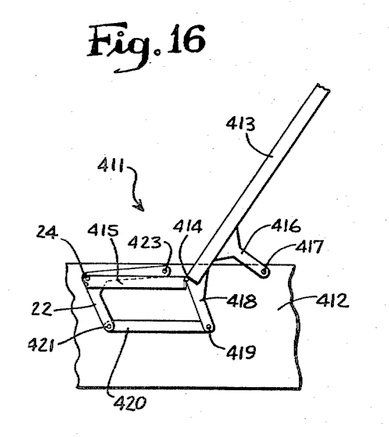

Referring now to Fig. 16, there is shown still another modified form of the invention indicated generally by the reference numeral 411 and comprising a frame 412, and a back section 413 pivotally connected at 414 to a seat section 415. A member 416 has one end fixedly secured to back section 413 and its opposite end is pivotally mounted to frame 412 for swinging movement about a horizontal axis indicated at 417. Another member 418 has one end fixedly secured to back section 413 at the forward end thereof and extends downwardly therefrom. The lower end of member 418 is pivotally connected at 419 to one end of a horizontal link member 420 having its forward end pivotally connected at 421 to one end of a bell-crank member 422. The opposite end of the latter is pivotally connected at 423 to frame 412, and the intermediate portion of bell-crank member 422 is pivotally connected at 424 to the forward end of seat section 415.

The distance between pivotal axes 423 and 417 is substantially equal to the distance between axes 424 and 414, and also to the distance between axes 421 and 419. The distance between axes 423 and 424 is substantially equal to the distance between axes 417 and 414. The distance between axes 424 and 421 is substantially equal to the distance between axes 414 and 419. It will thus be seen that the sections and members of Fig. 16 constitute a parallelogram-type kinematic arrangement functioning in the manner heretofore described.

Figure 17:
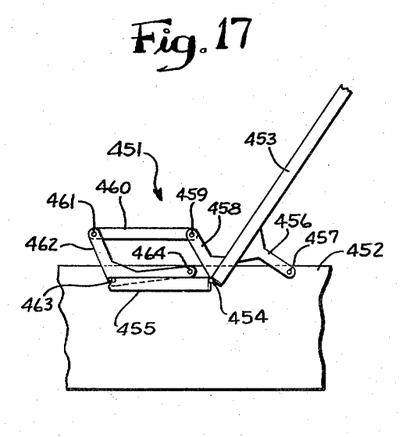

Referring now to Fig. 17, there is disclosed still another modified form of the invention designated generally by the reference numeral 451 and comprising a frame 452, and a back section 453 pivotally connected at 454 to a seat section 455. A member 456 is fixedly secured at its upper end to back section 453 and its lower end is pivotally connected at 457 to frame 452, whereby back section 453 is mounted for swinging movement about the horizontal pivotal axis 457. Another member 458 has its lower end fixedly secured to the forward end of seat section 453 and extends upwardly therefrom. The upper end of member 458 is pivotally connected at 459 to one end of a horizontal link member 460, the other end of which is pivotally connected at 461 to one end of a bell-crank member 462. The intermediate portion of the latter is pivotally connected at 463 to the forward end of seat section 455. The other end of bell-crank member 462 is pivotally connected at 464 to frame 452. The distance between each pair of pivotal axes is substantially equal to the distance between its opposite corresponding pair of axes, as pointed out with respect to Fig. 16, whereby the structure shown in Fig. 17 constitutes a parallelogram-type mechanism having the above-described advantages.

Figure 18:
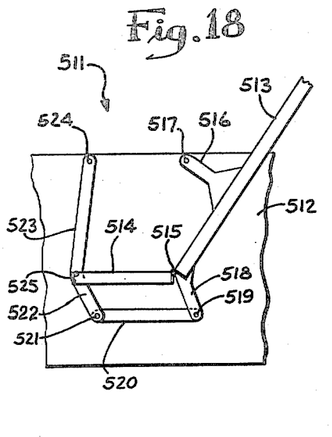

Referring to Fig. 18, there is shown still another modified form of the invention indicated generally by the reference numeral 511 and comprising a frame 512 and a back section 513 pivotally connected to a seat section 514 at 515. A member 516 is fixedly secured to an intermediate portion of back section 513 and projects upwardly therefrom. The upper end of member 516 is pivotally connected to frame 512 at 517, whereby back section 513 is mounted for swinging movement about the horizontal pivotal axis 517. Another member 518 is fixedly secured at the forward end of back section 513 and projects downwardly therefrom. The lower end of member 518 is pivotally connected at 519 to one end of a horizontal link member 520, the opposite end of which is pivotally connected at 521 to the lower end of the angularly disposed portion 522 of a link member 523. The upper end of the latter is pivotally connected at 524 to frame 512. The intermediate portion of link member 523 is pivotally connected at 525 to the forward end of seat section 514.

The distance between axes 524 and 517 is substantially equal to the distance between axes 525 and 515, and also to the distance between axes 521 and 519. The distance between axes 524 and 525 is substantially equal to the distance between axes 517 and 515. Similarly, the distance between axes 525 and 521 is substantially equal to the distance between axes 515 and 519. It will thus be seen that the various sections and members of the structure shown in Fig. 18 constitute a parallelogram-type kinematic mechanism having the advantageous mode of operation heretofore described.

Figure 19:
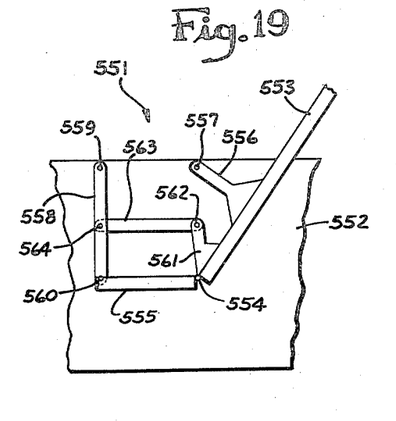

Referring now to Fig. 19, there is disclosed still another modified form of the invention indicated generally by the reference numeral 551 and comprising a frame 552 and a back section 553 pivotally connected at 554 to a seat section 555. A member 556 is fixedly secured at its lower end to an intermediate portion of back section 553 and extends upwardly therefrom. The upper end of member 556 is pivotally connected to frame 552 at 557, whereby back section 553 is mounted for swinging movement about the horizontal pivotal axis 557. A vertical link member 558 has its upper end pivotally connected to frame 552 at 559. The lower end of link member 558 is pivotally connected at 560 to the forward end of seat section 555. Another member 561 is fixedly secured adjacent the forward end of back section 553 and extends upwardly therefrom. The upper end of member 561 is pivotally connected at 562 to a horizontal link member 563, the other end of which is pivotally connected at 564 to an intermediate portion of vertical link member 558. The various pairs of pivotal axes are spaced apart a distance substantially equal to that between corresponding pairs of axes, as will be obvious from the more detailed description of Fig. 18, whereby the structure shown in Fig. 19 constitutes a parallelogram-type kinematic mechanism having the above-described advantages.

Figure 20:
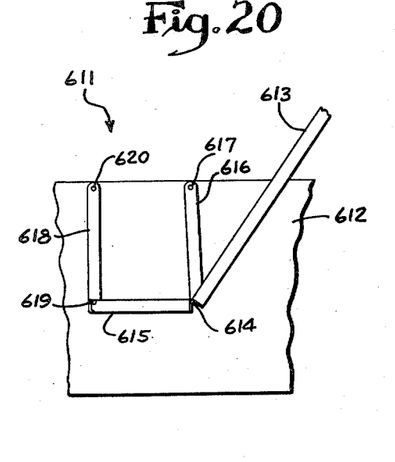

Referring now to Fig. 20, there is disclosed still another modified form of the invention indicated generally by the reference numeral 611 and comprising a frame 612 and a back section 613 pivotally connected at 614 to a seat section 615. A member 616 is fixedly secured at its lower end to back section 613 adjacent the forward end of the latter and extends upwardly therefrom. The upper end of member 616 is pivotally connected to frame 612 at 617. A link member 618 extends parallel to member 616 and has a lower end pivotally connected at 619 to the forward end of seat section 615. The upper end of link member 618 is pivotally connected at 620 to frame 612. The distance between pivotal axes 620 and 619 is substantially equal to the distance between axes 617 and 614. The distance between axes 620 and 617 is substantially equal to the distance between axes 619 and 614. It will thus be seen that the sections and members shown in Fig. 20 constitute still another pallelogram variation having the same novel and advantageous mode of operation heretofore described with reference to the structure shown in Figs. 1 to 9.

Other modifications and changes may be made with regard to the afore-described preferred embodiments of the device without departing from the spirit of the invention or the scope of the following claims.

What we claim and desire to secure by United States Letters Patent is:

1. A device for supporting a human body, said device comprising a frame, a back-rest section, a substantially horizontal seat section, at least two members, and means pivotally interconnecting said sections, said frame and said members for relative pivotal movement about at least four horizontal axes, said four horizontal axes being spaced from each other, the distance between a first one and a second one of said axes being substantially equal to the distance between a third one and a fourth one of said axes, the distance between said first and third axes being substantially equal to the distance between said second and fourth axes, said sections, said members, said frame and said means constituting a parallelogram-type kinematic mechanism whereby said seat section will be maintained in a horizontal position throughtout all movements of said sections, and whereby the weight of a human body exerted on one of said sections at a point spaced in one direction from said second axis will cause said mechanism to move in one direction and whereby the weight of a human body exerted on one of said sections at a point spaced in the opposite direction from said second axis will cause said mechanism to move in the opposite direction, a leg section pivotally connected to said seat section, and selectably operable means connecting said sections and actuable for either maintaining the leg section horizontal and co-planar with the seat section during raising or lowering movements of the latter or causing the leg section to assume an inclined position in response to lowering movement of the seat section.

2. A device for supporting a human body, comprising: a main frame, an auxiliary frame having a back-rest section, a seat section, a thigh section and a lower leg section; means pivotally connecting the ends of said sections whereby they constitute an articulated structure; means pivotally connecting said back-rest section to said main frame at a point spaced from the point of connection between said seat section and said back-rest section whereby it may pivot between a normal horizontal position and a vertically inclined position said seat section moving vertically relative to said main frame during pivotal movement of said back-rest section; means interposed between said seat section and said main frame for constantly maintaining said seat section in a horizontal position while moving vertically relative to said main frame; linkage means interposed between said seat section and said thigh and lower leg sections; and selectively engageable control means for said linkage means causing it to alternately function as a parallelogram mechanism whereby said thigh and lower leg sections will remain in horizontal alignment with said seat section during pivotal movement of said back-rest section, or as a mechanism wherein said thigh and lower leg sections undergo concurrent vertical pivotal movement during pivotal movement of said back-rest section whereby said auxiliary frame may assume a contour position.

3. A device as set forth in claim 2 which includes a selectively engageable brake mechanism for holding said sections in a desired relative angularity.

4. A device for supporting a human body, comprising: a main frame having longitudinally extending side elements; an auxiliary frame having a back-rest section, a seat section, a thigh section and a lower leg section; means connecting the ends of said sections whereby they constitute an articulated structure; means pivotally connecting said back-rest section to the side elements of said main frame whereby it may pivot about a horizontal axis between a normal horizontal position and a vertically inclined position; a first transversely extending horizontal shaft pivotally carried by said side elements below and adjacent said seat section; a plurality of other transversely extending horizontal shafts pivotally carried by said side elements below and adjacent said thigh and lower leg sections; a longitudinally extending force-transfer bar; a lever rigidly extending from each of said shafts; means pivotally connecting the free ends of said levers to longitudinally spaced points on said force-transfer bar; and linkage means connected to and between said first shaft and said seat section and between each of said other shafts and said thigh and lower leg sections for constantly maintaining said seat, thigh and lower leg sections in horizontal alignment as said back-rest section undergoes vertical pivotal movement.

5. A device as set forth in claim 4 which includes selectively-operable means for locking said force-transfer bar to said main frame so as to cause said thigh and lower leg sections to undergo concurrent vertical pivotal movement during pivotal movement of said back-rest section whereby said auxiliary frame may assume a contour position.

6. A device as set forth in claim 5 which includes a selectively engageable brake mechanism for holding said sections in a desired relative angularity.

7. A device for supporting a human body, comprising: a main frame having longitudinally extending side elements; an auxiliary frame having a back-rest section, a seat section, a thigh section and a lower leg section; means pivotally connecting the ends of said sections whereby they constitute an articulated structure; means pivotally connecting said back-rest section to the side elements of said main frame whereby it may pivot about a horizontal axis between a normal horizontal position and a vertically inclined position; a transversely extending horizontal shaft pivotally carried by the side elements of said main frame; a lever locked to said shaft; a crank arm secured to said shaft; a bracket extending from said seat section and pivotally connected to said crank arm whereby said seat section will be constantly maintained in a horizontal position during pivotal movement of said back-rest section; and a parallelogram mechanism connected to and between said lever and said thigh and lower leg sections for constantly maintaining them in horizontal alignment with said seat section.

8. A device for supporting a human body comprising: a main frame having longitudinally extending side elements; an auxiliary frame having a back-rest section, a seat section, a thigh section and a leg section; means pivotally connecting the ends of said sections whereby they constitute an articulated structure; means pivotally connecting said back-rest section to the side elements of said main frame whereby it may pivot about a horizontal axis between a normal horizontal position and a vertically inclined position; a first transversely extending horizontal shaft journaled by the side elements of said main frame; a first lever locked to said first shaft; a crank arm secured to said shaft; a bracket extending from said seat section and pivotally connected to said crank arm whereby said seat section will be constantly maintained in a horizontal position during pivotal movement of said back-rest section; additional transversely extending horizontal shafts journaled by the side elements of said main frame; a lever locked to each of said additional shafts; a longitudinally extending force-transfer bar; means pivotally connecting the free ends of said levers to longitudinally spaced points on said bar; an auxiliary crank arm secured to each of said additional shafts; and link elements pivotally interposed between the free ends of said auxiliary crank arms and said leg section whereby said thigh and leg sections will constantly remain in horizontal alignment with said seat section.

9. A device as set forth in claim 8 which includes selectively operable means for locking said first lever to said main frame and releasing said first-mentioned crank arm for rotation relative to said first shaft permitting said thigh and leg sections to undergo concurrent vertical pivotal movement during pivotal movement of said back-rest section whereby said auxiliary frame may assume a contour position.

10. A device as set forth in claim 9 which includes a selectively engageable brake mechanism for holding said sections in a desired relative angularity.

11. A device for supporting a human body, comprising: a main frame having longitudinally extending side elements; an auxiliary frame having a back-rest section, a seat section, a thigh section and a lower leg section; means pivotally connecting the ends of said sections whereby they constitute an articulated structure; means pivotally connecting said back-rest section to the side elements of said main frame whereby it may pivot about a horizontal axis between a normal horizontal position and a vertically inclined position; a first transversely extending horizontal shaft journaled by the side elements of said main frame; a tube journaled by said first shaft; a first lever rigidly extending from said shaft; a crank arm rigidly extending from said tube; a bracket extending from said seat section and pivotally connected to said crank arm whereby said seat section will be constantly maintained in a horizontal position during pivotal movement of said back-rest section; additional transversely extending horizontal shafts journaled by the side elements of said main frame; a lever locked to each of said additional shafts; a longitudinally extending force-transfer bar; means pivotally connecting the free ends of said levers to longitudinally spaced points on said bar; an auxiliary crank arm secured to each of said additional shafts; link elements pivotally interposed between the free ends of said auxiliary crank arms and said lower leg section; and selectively operable control means for alternately locking said first shaft to said main frame or said tube to said first shaft.

12. A device as set forth in claim 11 where said control means comprises a control rod pivotally mounted by said shaft within a cavity formed in the latter, a dog element pivotally connected to said control rod, a bore extending from said cavity wherein is slidably disposed said dog element, an aperture formed in said tube in alignment with said bore, and a notch formed in said main frame for receiving said control rod when said dog element is withdrawn from said aperture, said first shaft being locked to said main frame when said rod is disposed in said notch and said tube being locked to said first shaft when said dog element extends from said bore into said aperture.

13. A device as set forth in claim 12 which includes a post rigidly extending from said first lever and a counterbalance weight carried by said post for constantly biasing said back-rest section toward its normal horizontal position.

14. A device as set forth in claim 13 which includes selectively operable brake means interposed between said main frame and said seat section for holding said sections in any desired angularity.

15. A device as set forth in claim 14 where said brake means includes a pair of spaced parallel plates mounted by said seat section, means normally urging said plates towards each other, means for moving said plates apart, and an elongated tongue element having one of its ends pivotally secured to said main frame and its other end portion slidably disposed between said plates.

16. A device as set forth in claim 11 which includes a post rigidly extending from said first lever and a counterbalance weight carried by said post for constantly biasing said back-rest section towards its normal horizontal position.

17. A device as set forth in claim 11 which includes selectively operable brake means interposed between said main frame and said seat section for holding said sections in any desired angularity.

18. A device for supporting a human body, said device comprising a frame, a back-rest section, a substantially horizontal seat section, means pivotally connecting said back-rest section to said seat section, means pivotally connecting said back-rest section to said frame for pivotal movement of said back-rest section about a horizontal axis, a link member, means pivotally interconnecting one portion of said link member and said seat section, and means pivotally connecting another portion of said link member to said frame, said sections, said member, said frame and said means constituting a parallelogram-type kinematic mechanism whereby said seat section will be maintained in a horizontal position throughout all movements of said sections, and whereby the weight of a human body exerted on one of said sections at a point spaced in one direction from said axis will cause said mechanism to move in one direction and whereby the weight of a human body exerted on one of said sections at a point spaced in the opposite direction from said axis will cause said mechanism to move in the opposite direction, an upper leg section connected to said seat section, a lower leg section connected to said upper leg section, and selectably operable means actuable for either maintaining said leg sections horizontal and co-planar with said seat section during raising or lowering movements of the seat section or causing said leg sections to assume inclined positions in response to lowering movements of said seat section.

19. A device for supporting a human body, comprising: a main frame having longitudinally extending side elements; an auxiliary frame having a back-rest section and a seat section, the proximate ends of said sections being pivotally interconnected for relative vertical pivotal movement about a horizontal axis; means interposed between said seat section and said main frame for constantly maintaining said seat section in a horizontal position; and a pair of aligned pivot pins attaching the sides of said back-rest section to the side elements of said main frame at a point spaced rearwardly from the front end thereof whereby said back-rest section may pivot about a second horizontal axis parallel to said first-mentioned horizontal axis relative to said main frame, the weight of a human body being substantially equally distributed along a first lever arm extending from said second horizontal axis to the front end of said back-rest section and along a second lever arm extending in the opposite direction from said second horizontal axis to the front end of said seat section, a leg section pivotally connected to said seat section, and selectably operable means actuable for either maintaining said leg section horizontal and co-planar with said seat section or causing said leg section to assume inclined positions, in response to lowering movement of the seat section.

20. A device for supporting a human body, said device comprising a frame, a back-rest section, a substantially horizontal seat section, means pivotally connecting said back-rest section to said seat section for relative pivotal movement of said sections about a first horizontal axis, means pivotally connecting said back-rest section to said frame for pivotal movement of said back-rest section about a second horizontal axis, a link member, means pivotally connecting one portion of said link member to said seat section for relative pivotal movement about a third horizontal axis, and means pivotally connecting another portion of said link member to said frame for relative pivotal movement about a fourth horizontal axis, the distance between said first and second horizontal axes being substantially equal to the distance between said third and fourth horizontal axes, the distance between said first and third horizontal axes being substantially equal to the distance between said second and fourth horizontal axes, said sections, said member, said frame and said means cooperating to constitute a parallelogram-type kinematic mechanism whereby said seat section will be maintained in a horizontal position throughout all movements of said sections, and whereby the weight of a human body exerted on one of said sections at a point spaced in one direction from said second axis will cause said mechanism to move in one direction and whereby the weight of a human body exerted on one of said sections at a point spaced in the opposite direction from said second axis will cause said mechanism to move in the opposite direction, a leg section pivotally connected to said seat section, and selectably operable means actuable for either maintaining said leg section horizontal and co-planar with said seat section during raising or lowering movements of the latter or causing said leg section to assume inclined positions in response to lowering movements of said seat section.

21. A device for supporting a human body, said device comprising a frame, a back-rest section, a substantially horizontal seat section, a pair of members, one of said members being rigidly secured to one of said sections, the other of said members being pivotally connected to said frame about a horizontal axis, and means pivotally connecting said sections, said frame and said members for relative pivotal movement about three additional horizontal axes, said four horizontal axes being spaced from each other, the distance between a first one and a second one of said axes being substantially equal to the distance between a third one and a fourth one of said axes, the distance between said first and third axes being substantially equal to the distance between said second and fourth axes, said sections, said members, said frame and said means constituting a parallelogram-type kinematic mechanism whereby said seat section will be maintained in a horizontal position throughout all movements of said sections, and whereby the weight of a human body exerted on one of said sections at a point spaced in one direction from said second axis will cause said mechanism to move in one direction and whereby the weight of a human body exerted on one of said sections at a point spaced in the opposite direction from said second axis will cause said mechanism to move in the opposite direction, an upper leg section connected to said seat section, a lower leg section connected to said upper leg section, and selectably operable means actuable for either maintaining said leg sections horizontal and co-planar with said seat section during raising or lowering movements of the seat section or causing said leg sections to assume inclined positions in response to the attainment of a lower position by said seat section.

22. A device for supporting a human body, said device comprising a frame, a back-rest section, a substantially horizontal seat section, and pivotal means interconnecting said frame and said sections and cooperating therewith to constitute a parallelogram-type kinematic mechanism comprising four pivotal horizontal axes, the distance between a first one and a second one of said axes being substantially equal to the distance between a third one and a fourth one of said axes, the distance between said first and third axes being substantially equal to the distance between said second and fourth axes, said back-rest section being pivotally mounted for alternate swinging movements about said second axis between horizontal and vertically-inclined positions of said back-rest section, whereby the weight of a human body exerted on one of said sections at a point spaced in one direction from said second axis will cause said mechanism to move in one direction and whereby the weight of a human body exerted on one of said sections at a point spaced in the opposite direction from said second axis will cause said mechanism to move in the opposite direction, said seat section remaining substantially horizontal throughout movement of said back-rest section and the other elements of said mechanism, a leg section pivotally connected to said seat section, and selectably operable means connecting said sections and actuable for either maintaining the leg section horizontal and co-planar with the seat section during raising or lowering movements of the latter or causing the leg section to assume an inclined position in response to lowering movement of the seat section.

23. A device for supporting a human body, said device comprising a frame, a back-rest section, a substantially horizontal seat section, at least two members, and means pivotally interconnecting said sections, said frame and said members for relative pivotal movement about at least four horizontal axes, said four horizontal axes being spaced from each other, the distance between a first one and a second one of said axes being substantially equal to the distance between a third one and a fourth one of said axes, the distance between said first and third axes being substantially equal to the distance between said second and fourth axes, said sections, said members, said frame and said means constituting a parallelogram-type kinematic mechanism whereby said seat section will be maintained in a horizontal position throughout all movements of said sections, a leg section pivotally connected to said seat section, and selectably operable means actuable for either maintaining said leg section horizontal and co-planar with said seat section or causing said leg section to assume inclined positions, in response to lowering movement of the seat section.

24. A device for supporting a human body, said device comprising a frame, a back-rest section, a substantially horizontal seat section, means pivotally connecting said back-rest section to said seat section, means pivotally connecting said back-rest section to said frame for pivotal movement of said back-rest section about a horizontal axis, a link member, means pivotally interconnecting one portion of said link member and said seat section, and means pivotally connecting another portion of said link member to said frame, said sections, said member, said frame and said means constituting a parallelogram-type kinematic mechanism whereby said seat section will be maintained in a horizontal position throughout all movements of said sections, a leg section pivotally connected to said seat section, and selectably operable means connecting said sections and actuable for either maintaining the leg section horizontal and co-planar with the seat section during raising or lowering movements of the latter or causing the leg section to assume an inclined position in response to lowering movement of the seat section.

25. A device for supporting a human body, said device comprising a frame, a back-rest section, a substantially horizontal seat section, a pair of members, one of said members being rigidly secured to one of said sections, the other of said members being pivotally connected to said frame about a horizontal axis, and means pivotally connecting said sections, said frame and said members for relative pivotal movement about three additional horizontal axes, said four horizontal axes being spaced from each other, the distance between a first one and a second one of said axes being substantially equal to the distance between a third one and a fourth one of said axes, the distance between said first and third axes being substantially equal to the distance between said second and fourth axes, said sections, said members, said frame and said means constituting a parallelogram-type kinematic mechanism whereby said seat section will be maintained in a horizontal position throughout all movements of said sections, an upper leg section connected to said seat section, a lower leg section connected to said upper leg section, and selectably operable means actuable for either maintaining said leg sections horizontal and co-planar with said seat section or causing said leg sections to assume inclined positions, in response to lowering movement of the seat section.

26. A device for supporting a human body, said device comprising a frame, a back-rest section pivotally connected to said frame for pivotal movement between a horizontal position and a vertically inclined position, a horizontal seat section having one end pivotally connected to said back-rest section, a thigh section having one end pivotally connected to the other end of said seat section, a lower leg section pivotally connected to the other end of said thigh section, means connecting said frame and seat section for maintaining the seat section in a horizontal position as the seat section is raised or lowered during pivotal movement of the back-rest section, and selectably operable means connecting said frame and said thigh, seat and lower leg sections and actuable for either maintaining the thigh and lower leg sections horizontal and co-planar with the seat section during raising or lowering movements of the latter or causing the thigh and lower leg sections to assume inclined positions in response to lowering movement of the seat section as the back-rest section pivots from its said horizontal position toward its said vertically inclined position.

27. A device as recited in claim 26 wherein said selectably operable means comprises a movable member, link means connecting said member and at least one of said thigh and lower leg sections for maintaining said sections horizontal and co-planar with the seat section in response to movement of said member and for causing said sections to assume inclined positions in response to non-movement of said member as the seat section is lowered, and selectably engageable means interconnecting said seat section and said member either for moving said member in response to movement of the seat section or disengageable for allowing said member to remain stationary during movement of the seat section.

28. A device for supporting a human body, said device comprising a frame, a back-rest section, a substantially horizontal seat section, and pivotal means interconnecting said frame and said sections and cooperating therewith to constitute a parallelogram-type kinematic mechanism comprising four pivotal horizontal axes, the distance between a first one and a second one of said axes being substantially equal to the distance between a third one and a fourth one of said axes, the distance between said first and third axes being substantially equal to the distance between said second and fourth axes, said back-rest section being pivotally mounted for alternate swinging movements about said second axis between horizontal and vertically-inclined positions of said back-rest section, said seat section remaining substantially horizontal throughout movement of said back-rest section and the other elements of said mechanism, a thigh section connected to said seat section, a lower leg section connected to the thigh section, and selectably operable means connecting said frame and said thigh, seat and lower leg sections and actuable for either maintaining the thigh and lower leg sections horizontal and co-planar with the seat section during raising or lowering movements of the latter or causing the thigh and lower leg sections to assume inclined positions in response to lowering movement of the seat section as the back-rest section pivots from its said horizontal position toward its said vertically inclined position.

29. A device as recited in claim 28 wherein said selectably operable means comprises a movable member, link means connecting said member and at least one of said thigh and lower leg sections for maintaining said sections horizontal and co-planar with the seat section in response to movement of said member and for causing said sections to assume inclined positions in response to non-movement of said member as the seat section is lowered, and selectably engageable means either for moving said member in response to movement of the seat section or disengageable for allowing said member to remain stationary during movement of the seat section.

30. A device for supporting a human body, said device comprising a frame, a back-rest section pivotally connected to said frame for pivotal movement between a horizontal position and a vertically inclined position, a horizontal seat section having one end pivotally connected to said back-rest section, a leg section pivotally connected to the other end of said seat section, means connecting said frame and seat section for maintaining the seat section in a horizontal position as the seat section is raised or lowered during pivotal movement of the back-rest section, and selectably operable means connecting said frame, seat and leg sections and actuable for either maintaining the leg section horizontal and co-planar with the seat section during raising or lowering movements of the latter or causing the leg section to assume an inclined position in response to lowering movement of the seat section as the back-rest section pivots from its said horizontal position toward its said vertically inclined position.

31. A device as recited in claim 30 wherein said selectably operable means comprises a movable member, means connecting said member and said leg section for maintaining the latter horizontal and co-planar with the seat section in response to movement of said member and for causing said leg section to assume an inclined position in response to non-movement of said member as the seat section is lowered, and selectably engageable means interconnecting one of said sections and said member either for moving said member in response to movement of the seat section or disengageable for allowing said member to remain stationary during movement of the seat section.

32. A device for supporting a human body, said device comprising a frame, a back-rest section, a substantially horizontal seat section, and pivotal means interconnecting said frame and said sections and cooperating therewith to constitute a parallelogram-type kinematic mechanism comprising four pivotal horizontal axes, the distance between a first one and a second one of said axes being substantially equal to the distance between a third one and a fourth one of said axes, the distance between said first and third axes being substantially equal to the distance between said second and fourth axes, said back-rest section being pivotally mounted for alternate swinging movements about said second axis between horizontal and vertically-inclined positions of said back-rest section, said seat section remaining substantially horizontal throuhgout movement of said back-rest section and the other elements of said mechanism, a leg section connected to said seat section, and selectably operable means connecting said frame and said sections and actuable for either maintaining the leg section horizontal and co-planar with the said seat section during raising or lowering movements of the latter or causing the leg section to assume inclined positions in response to lowering movement of the seat section as the back-rest section pivots from its said horizontal position toward its said vertically inclined position.

33. A device as recited in claim 32 wherein said selectably operable means comprises a movable member, means connecting said member and said leg section for maintaining the latter horizontal and co-planar with the seat section in response to movement of said member and for causing said seat section to assume an inclined position in response to non-movement of said member as the seat section is lowered, and selectably engageable means interconnecting one of said sections and said member either for moving said member in response to movement of the seat section or disengageable for allowing said member to remain stationary during movement of the seat section.

34. A device for supporting a human body, said device comprising a frame, a back-rest section pivotally connected to said frame for pivotal movement between a horizontal position and a vertically inclined position, a horizontal seat section, a leg section, means connecting said frame and seat section for maintaining the seat section in a horizontal position as the seat section is raised or lowered during pivotal movement of the back-rest section, and selectably operable means connecting said frame, seat and leg sections and actuable for either maintaining the leg section horizontal and co-planar with the seat section during raising or lowering movements of the latter or causing the leg section to assume an inclined position, in response to lowering movement of the seat section.

35. A device as recited in claim 34 wherein said selectably operable means comprises a movable member, means connecting said member and said leg section for maintaining the latter horizontal and co-planar with the seat section in response to movement of said member and for causing said leg section to assume an inclined position in response to non-movement of said member as the seat section is lowered, and selectably engageable means interconnecting one of said sections and said member either for moving said member in response to movement of the seat section or disengageable for allowing said member to remain stationary during movement of the seat section.

References Cited in the file of this patent

UNITED STATES PATENTS

| Number | Name | Date |
|---|---|---|
| 364,732 | Santee | June 14, 1887 |
| 447,257 | Parkinson | Feb. 24, 1891 |
| 594,846 | Bennett | Dec. 7, 1897 |
| 879,442 | Clemctson | Feb. 18, 1908 |
| 945,928 | Fowler et al. | Jan. 11, 1910 |
| 1,087,497 | Killman | Feb. 17, 1914 |
| 1,243,887 | Stark | Oct. 23, 1917 |
| 1,688,576 | Doyle | Oct. 23, 1928 |
| 1,709,137 | Loxley | Apr. 16, 1929 |
| 1,790,435 | Muller | Jan. 27, 1931 |
| 1,908,530 | Nixon et al. | May 9, 1933 |
| 2,194,998 | Christensen | Mar. 26, 1940 |
| 2,336,850 | Davis | Dec. 14, 1943 |
| 2,346,629 | Travers | Apr. 11, 1944 |
| 2,617,118 | Lorenz | Nov. 11, 1952 |
| 2,658,209 | Travis | Nov. 10, 1953 |
| 2,678,087 | McKinley | May 11, 1954 |